United States Patent
Hoshiba et al.

(10) Patent No.: US 12,179,390 B2
(45) Date of Patent: Dec. 31, 2024

(54) PNEUMATIC TIRE AND METHOD OF MANUFACTURING THE SAME

(71) Applicant: The Yokohama Rubber Co., LTD., Tokyo (JP)

(72) Inventors: Takashi Hoshiba, Hiratuska (JP); Masahiro Naruse, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/856,066

(22) Filed: Jul. 1, 2022

(65) Prior Publication Data

US 2022/0332019 A1     Oct. 20, 2022

Related U.S. Application Data

(62) Division of application No. 16/484,816, filed as application No. PCT/JP2017/040959 on Nov. 14, 2017.

(30) Foreign Application Priority Data

Feb. 8, 2017   (JP) ................... 2017-021295

(51) Int. Cl.
| | |
|---|---|
| *B29C 33/02* | (2006.01) |
| *B29C 33/64* | (2006.01) |
| *B29C 35/02* | (2006.01) |
| *B29D 30/06* | (2006.01) |
| *B29L 30/00* | (2006.01) |
| *B60C 5/14* | (2006.01) |

(52) U.S. Cl.
CPC .............. *B29C 33/02* (2013.01); *B29C 33/64* (2013.01); *B29C 35/02* (2013.01); *B29D 2030/0682* (2013.01); *B29L 2030/00* (2013.01); *B60C 5/14* (2013.01)

(58) Field of Classification Search
CPC ......... B29C 33/02; B29C 33/64; B29C 35/02; B29C 37/0067; B29L 2030/00; B60C 5/14; B29D 2030/0655; B29D 2030/0682; B29D 30/0654
See application file for complete search history.

(56) References Cited

U.S. PATENT DOCUMENTS

| | | |
|---|---|---|
| 4,509,984 A | 4/1985 | Scheiderich et al. |
| 4,547,544 A | 10/1985 | Allardice et al. |
| 4,563,650 A | 1/1986 | York et al. |

(Continued)

FOREIGN PATENT DOCUMENTS

| | | |
|---|---|---|
| JP | S57-119992 | 7/1982 |
| JP | S59-106948 | 6/1984 |

(Continued)

OTHER PUBLICATIONS

International Search Report for International Application No. PCT/JP2017/040959 dated Feb. 6, 2018, 4pages, Japan.

*Primary Examiner* — Emmanuel S Luk
*Assistant Examiner* — Victoria Bartlett
(74) *Attorney, Agent, or Firm* — Thorpe North & Western

(57) ABSTRACT

A pneumatic tire is vulcanized by using a bladder provided with a coating layer formed by a release agent, and the release agent has a thickness, detected by an electron microscope, of 0.1 μm to 100 μm on an inner surface of a tread portion 1.

12 Claims, 2 Drawing Sheets

(56) References Cited

U.S. PATENT DOCUMENTS

| | | |
|---|---|---|
| 2009/0114329 A1 | 5/2009 | Tornoi |
| 2011/0056612 A1 | 3/2011 | Sugimoto |
| 2013/0186539 A1 | 7/2013 | Takahashi |
| 2015/0042001 A1 | 2/2015 | Dubos et al. |
| 2016/0229091 A1 | 8/2016 | Mohler et al. |
| 2016/0376517 A1 | 12/2016 | Breunig et al. |
| 2017/0218131 A1 | 8/2017 | Son et al. |
| 2018/0036917 A1 | 2/2018 | Inokuchi et al. |

FOREIGN PATENT DOCUMENTS

| | | | |
|---|---|---|---|
| JP | S60-229719 | | 11/1985 |
| JP | H05-096546 | | 4/1993 |
| JP | H06-134769 | | 5/1994 |
| JP | H08-134769 | | 1/1996 |
| JP | 2002-337153 A | | 11/2002 |
| JP | 2004305795 A | * | 11/2004 |
| JP | 2011-056812 | | 3/2011 |
| JP | 2014-121847 A | | 7/2014 |
| JP | 2016-540662 | | 12/2016 |
| JP | 2017/024204 | | 2/2017 |
| KR | 2005-0051007 A | * | 3/2006 |
| WO | WO 2015/090547 | | 6/2015 |
| WO | WO 2016/132834 | | 8/2016 |

\* cited by examiner

PNEUMATIC TIRE AND METHOD OF MANUFACTURING THE SAME

RELATED APPLICATIONS

This application is a divisional of U.S. patent application Ser. No. 16/484,816, filed on Aug. 8, 2019, which is the National Stage of International Patent Application No. PCT/JP2017/040959, filed on Nov. 14, 2017, which claims the benefit of priority from Japan Patent Application No. 2017-021295, filed on Feb. 8, 2017.

TECHNICAL FIELD

The present technology relates to a pneumatic tire and a method for manufacturing the same. More specifically, the present technology relates to a pneumatic tire that is vulcanized using a bladder with a coating layer formed by a release agent to be in a state where a small amount of the release agent is attached on an inner surface of the tire, so that both air retention and sealing for puncture repair can be achieved without resulting in bad rim shifting during traveling, and to a method for manufacturing the same.

BACKGROUND ART

When vulcanizing a green tire using a bladder, the bladder is prone to stick to the inner surface of the green tire. Therefore, by applying a release agent to the inner surface of the green tire, sticking between the green tire and the bladder is prevented (see Japan Unexamined Patent Publication No. H05-096546, for example).

However, when the amount of the release agent applied to the tire inner surface is too small, air retention due to the release agent cannot be sufficiently obtained. On the other hand, if the amount of the release agent is too large, the release agent will repel puncture repair liquid when the puncture is repaired, to result in compromised sealing. Additionally, when a powdered release agent is applied to the tire inner surface, the release agent may scatter to the bead portion. The molded pneumatic tire vulcanized with a large amount of release agent attached to the vicinity of the bead portion has bad rim shifting during traveling.

SUMMARY

The present technology provides a pneumatic tire that is vulcanized using a bladder with a coating layer formed by a release agent to be in a state where a small amount of the release agent is attached on an inner surface of the tire, so that both air retention and sealing for puncture repair can be achieved without resulting in bad rim shifting during traveling, and a method for manufacturing the same.

A pneumatic tire according to an embodiment of the present technology is a pneumatic tire vulcanized by using a bladder provided with a coating layer formed by a release agent, wherein the release agent has a thickness, detected by an electron microscope, of 0.1 µm to 100 µm on an inner surface of a tread portion.

A pneumatic tire according to an embodiment of the present technology is a pneumatic tire vulcanized by using a bladder provided with a coating layer formed by a release agent, wherein an amount of silicon in the release agent detected by X-ray fluorescence analysis is 0.1 wt. % to 10.0 wt. % on an inner surface of a tread portion.

A method for manufacturing a pneumatic tire according to an embodiment of the present technology is a method for manufacturing a pneumatic tire comprising: vulcanizing a green tire using a bladder having a coating layer formed by a release agent, wherein the release agent has a thickness, detected by an electron microscope, of 0.1 µm to 100 µm on an inner surface of a tread portion of the pneumatic tire after the vulcanization.

A method for manufacturing a pneumatic tire according to an embodiment of the present technology is a method for manufacturing a pneumatic tire comprising: vulcanizing a green tire using a bladder having a coating layer formed by a release agent, wherein an amount of silicon in the release agent detected by X-ray fluorescence analysis is 0.1 wt. % to 10.0 wt. % on an inner surface of a tread portion of the pneumatic tire after the vulcanization.

In an embodiment of the present technology, by performing vulcanization using a bladder provided with a coating layer formed by a release agent, a thickness of the release agent on the inner surface of the tire can be 0.1 µm to 100 µm, and an amount of silicon in the release agent can be 0.1 wt. % to 10.0 wt. %. With the release agent in such a small amount attached to the tire inner surface in this manner inhibits the permeation of air from the tire inner surface, so that air retention can be improved. Furthermore, sealing for puncture repair can be improved. Furthermore, according to an embodiment of the present technology, unlike the case where a powdered release agent is sprayed on the tire inner surface as in the conventional art, the release agent does not excessively adhere to the vicinity of the bead portion, and thus will not result in bad rim shifting. As a result, the air retention and the sealing for puncture repair can both be achieved without resulting in bad rim shifting during traveling.

DETAILED DESCRIPTION

Configurations of embodiments of the present technology are described in detail below with reference to the accompanying drawings. Note that in FIG. 1, CL denotes the tire center line.

Figure 1:
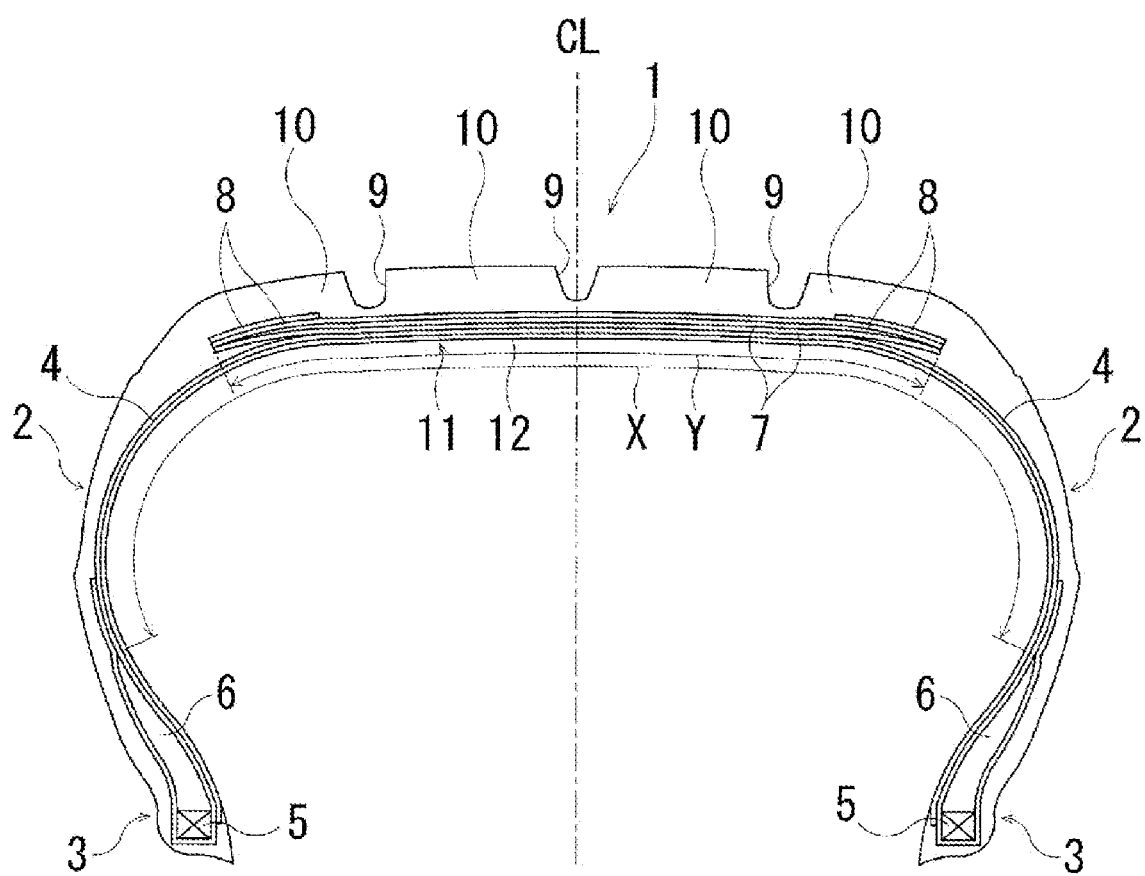
FIG. 1 is a meridian cross-sectional view illustrating a pneumatic tire according to an embodiment of the present technology.

As illustrated in FIG. 1, a pneumatic tire according to an embodiment of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is provided between the pair of bead portions 3,3. The carcass layer 4 includes a plurality of reinforcing cords extending in the tire radial direction, and is folded back around bead cores 5, disposed in the respective bead portions 3, from the tire inner side to the tire outer side. A bead filler 6 formed by a rubber composition having a triangular cross section is disposed on the outer circumference of each of the bead cores 5.

A plurality of belt layers 7 are embedded on the outer circumferential side of the carcass layer 4 in the tread portion 1. The belt layers 7 include a plurality of reinforcing cords inclined with respect to the tire circumferential direction, and the reinforcing cords of the respective layers cross each other. In the belt layer 7, the inclination angle of the reinforcing cords with respect to the tire circumferential direction is set to be in a range from 10° to 40°, for example. Steel cords are preferably used as the reinforcing cords of the belt layers 7. In order to improve high-speed durability, at least one belt cover layer 8 formed by arranging reinforcing cords at an angle of, for example, 5° or less with respect to the tire circumferential direction is disposed on the outer circumferential side of the belt layers 7. Organic fiber cords such as nylon or aramid are preferably used as the reinforcing cords of the belt cover layer 8.

Additionally, a plurality of main grooves 9 extending in the tire circumferential direction are formed in the tread portion 1. A plurality of land portions 10 are defined by the main grooves 9 in the tread portion 1.

Note that the tire internal structure described above is an exemplary example of a pneumatic tire, and should not be construed in a limiting sense.

Figure 2:
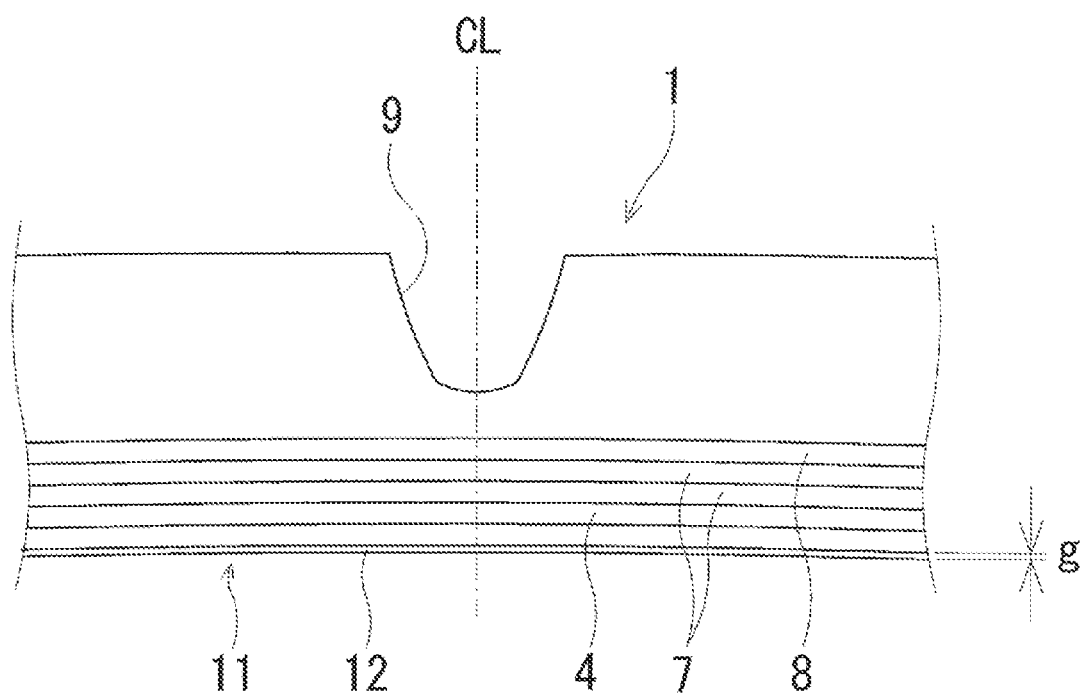
FIG. 2 is a cross-sectional view illustrating an enlarged portion of a part of the pneumatic tire according to an embodiment of the present technology.

In the pneumatic tire described above, as illustrated in FIG. 2, a transfer layer 12 formed by a release agent is present inward of the tire inner surface 11 in the tire radial direction. The green tire is vulcanized using a bladder provided with a coating layer formed by a release agent, whereby the transfer layer 12 formed by the release agent is transferred on the tire inner surface 11 of the vulcanized pneumatic tire. The release agent transferred in this manner is not entirely transferred but is dispersed on the tire inner surface 11.

The transfer layer 12 formed by the release agent has a thickness in a range from 0.1 µm to 100 µm. The thickness g of the transfer layer 12 formed by the release agent can be detected using an electron microscope. When measuring the thickness g of the transfer layer 12 formed by the release agent using an electron microscope, the thicknesses of a plurality of locations (for example, four locations in the tire circumferential direction and three locations in the tire lateral direction) are measured using a sample obtained by cutting out the pneumatic tire along the tire lateral direction. Then, the thickness g (average thickness) of the transfer layer 12 formed by the release agent is calculated by averaging the measurement values measured at the plurality of locations.

On the other hand, the amount of silicon in the release agent on the inner surface of the tread portion 1 is in a range from 0.1 wt. % to 10.0 wt, %. In the present technology, the amount of silicon that is the main component of a typical release agent is used an index for defining the amount of release agent on the inner surface of the tread portion 1. The amount of this silicon can be detected using X-ray fluorescence analysis which is generally conducted with a fundamental parameter method (FP method) and a calibration curve method. The present technology employs the FP method. When measuring the amount of the release agent (silicon), a sheet sample (dimensions: width 70 mm and the length 100 mm) is used. The sheet sample is obtained by peeling a carcass layer and an innerliner layer at a plurality of locations (for example, seven locations including four locations in the tire circumferential direction and three locations in the tire lateral direction) of the pneumatic tire. An X-ray fluorescence analyzer is used to measure the amount of release agent in each of samples (dimensions: width 13 mm to 15 mm, length 35 mm to 40 mm) extracted from a total of five locations of each sheet sample including four corner portions and one central portion. Then, the amount of release agent per sheet sample is calculated by averaging the measurement values of the five measurement samples for each of the sheet samples. These calculated values are each included in the range of 0.1 wt. % to 10.0 wt. %. Also, fluorescent x-ray particles have intrinsic energy proportional to atomic number, meaning that an element can be identified by measuring this intrinsic energy. Specifically, the intrinsic energy of silicon is 1.74 ±0.05 keV. Note that the number of fluorescent X-ray particles (X-ray intensity) of the release agent (silicon) is in a range of 0.1 cps/µA to 1.5 cps/µA.

The transfer layer 12 formed by the release agent is preferably disposed partially in a partial region, of the tire inner surface 11, in the tire lateral direction at least including a region from the upper edge position of one of the bead fillers 6 to the upper edge portion of the other one of the bead fillers 6. This region corresponds to a region X including the tire maximum width position, as illustrated in FIG. 1. By forming the transfer layer 12, by the release agent, in the region corresponding to at least the region X of the tire inner surface 11, the air retention and the sealing for puncture repair can both be improved. Furthermore, the transfer layer 12 formed by the release agent is more preferably partially disposed in a partial region, in the tire lateral direction (region Y illustrated in FIG. 1), at least including a lower portion of the belt layers 7.

Examples of components that can be compounded in the transfer layer 12 formed by the release agent include those containing a silicone component as an active ingredient. Examples of the silicone component include organopolysiloxanes, such as, for example, dialkylpolysiloxane, alkyl phenyl polysiloxane, alkyl aralkyl polysiloxane, 3,3,3-trifluoropropylmethylpolysiloxane, and the like. The dialkylpolysiloxane is, for example, dimethylpolysiloxane, diethylpolysiloxane, methyl isopropyl polysiloxane, and methyl dodecyl polysiloxane. Examples of the alkyl phenyl polysiloxane include a methylphenylpolysiloxane, a dimethylsiloxane-methylphenylsiloxane copolymer, and a dimethylsiloxane-diphenylsiloxane copolymer. Examples of the alkyl aralkyl polysiloxane include methyl (phenylethyl) polysiloxane, and methyl (phenylpropyl) polysiloxane. One type or two or more types of these organopolysiloxanes may be used in combination.

By performing vulcanization using a bladder provided with a coating layer formed by a release agent as described above, it is possible to achieve the thickness g of the release agent in a range from 0.1 µm to 100 µm on the tire inner surface 11 or the amount of silicon in the release agent in a range of 0.1 wt. % to 10.0 wt. %. The release agent in such a small amount attached to the tire inner surface 11 in this manner inhibits the permeation of air from the tire inner surface 11, so that air retention can be improved. Furthermore, sealing for puncture repair can be improved. Here, if the thickness of the release agent on the tire inner surface 11 is thinner than 0.1 µm, or the amount of silicon in the release agent is less than 0.1 wt. %, it is not possible to sufficiently prevent the green tire and the bladder from being attached during vulcanization. If the thickness of the release agent is greater than 100 µm or the amount of silicon in the release agent is greater than 10.0 wt. %, the release agent tends to repel the puncture repair liquid for puncture repair to compromise the sealing. In particular, the sealing is significant compromised in the vicinity of the belt end portion.

In addition, according to an embodiment in the present technology, unlike the case where a powdered release agent is sprayed on the tire inner surface 11 as in the conventional manner, the release agent does not excessively adhere to the vicinity of the bead portion 3, which can prevent bad rim shifting. As a result, the air retention and the sealing for puncture repair can both be achieved without resulting in bad rim shifting during traveling.

Next, a method of manufacturing the pneumatic tire according to an embodiment of the present technology will be described. When vulcanizing a green tire, a release agent is coated (preferably baked) on the bladder in advance to form a coating layer formed by the release agent on the outer surface of the bladder. The step of forming the coating layer on the outer surface of the bladder is implemented, for example, under storage, after the coating of the release agent, with a condition of an hour at 150° C., four hours at 90° C., or eight hours at ambient temperature. Furthermore, the step of forming the coating layer on the outer surface of the bladder is performed once, twice, or three times. The green tire is vulcanized using the bladder with the coating layer thus formed.

By performing vulcanization using a bladder provided with a coating layer formed by a release agent as described above, it is possible to achieve the thickness g of the release agent in a range from 0.1 μm to 100 μm on the tire inner surface 11 or the amount of silicon in the release agent in a range of 0.1 wt. % to 10.0 wt. %. The release agent in such a small amount attached to the tire inner surface 11 in this manner inhibits the permeation of air from the tire inner surface 11, so that air retention can be improved. Furthermore, sealing for puncture repair can be improved. In addition, according to an embodiment in the present technology, unlike the case where a powdered release agent is sprayed on the tire inner surface 11 as in the conventional manner, the release agent does not excessively adhere to the vicinity of the bead portion 3, which can prevent bad rim shifting. As a result, the air retention and the sealing for puncture repair can both be achieved without resulting in bad rim shifting during traveling.

In particular, the coating layer is preferably formed on the outer surface of the bladder with a coating time t (hour) and a temperature T (° C.) of the coating layer satisfying t≥−0.0571 T+9.14 and 10° C.≤T≤180° C. Furthermore, it is more preferable to set the temperature T to 90° C. and to set the coating time t to 4 hours, and it is even more preferable to set the temperature T to 150° C. and to set the coating time t to 1 hour. By satisfying these conditions, the time for coating the release agent in a bladder provided with the coating layer can be reduced, without shortening the bladder life. Here, higher temperatures T (° C.) allow the coating layer to be formed in a shorter period of time, but may cause deterioration of the bladder resulting in a shorter bladder life.

Examples

Pneumatic tires of Examples 1 to 3, having a tire size of 275/35ZR20, were manufactured through vulcanizing using a bladder provided with a coating layer formed by a release agent, with presence or absence of the release agent on the tire inner surface and the thickness (μm) of the release agent on the tire inner surface are set as illustrated in Table 1.

Tires of Comparative Examples 1 to 3 were also prepared. Comparative Example 1 had the same structure as Example 1 except that vulcanizing was performed with a rigid core used in place of the bladder and the release agent was not present on the tire inner surface. Comparative Example 2 had the same structure as Example 1 except the thickness of the release agent on the tire inner surface was set to 110 μm. Comparative Example 3 had the same structure as Example 1 except vulcanizing was performed with a powdered release agent sprayed on the tire inner surface, and the thickness of the release agent on the tire inner surface was set to 110 μm.

Note that in Table 1, the thickness (μm) of the release agent on the tire inner surface was determined by measuring the thickness of the release agent at four locations in the tire circumferential direction and three locations in the tire lateral direction of each of the test tires after the fabrication step was completed using a scanning electron microscope (SEM-EDX), and by averaging the resultant measurement values.

Air retention, sealing for puncture repair, and rim shifting were evaluated for these test tires according to the following test methods and the results were recorded in Table 1.

Air Retention:

Each of the test tires was mounted on wheels having a rim size of 20×9.5J, left for 24 hours under conditions of an air pressure of 270 kPa and a temperature of 21° C., and then the air pressure was measured for 42 days with the initial air pressure set to 250 kPa to obtain the inclination of the air leakage rate in a period between the day 15 to the day 42. The evaluation results are expressed as index values using the reciprocal of the measurement values, with the value of Comparative Example 1 being defined as 100. Larger index values indicate superior air retention.

Sealing for Puncture Repair:

Puncture holes (diameter 4 mm) were formed in a shoulder portion of each of the test tires. Next, the punctured tire was mounted on a drum testing machine, a tire sealant 450 mL was injected from a valve of the tire, and air was filled to achieve the tire internal pressure of 200 kPa. Thereafter, the intermittent driving of the tire alternatively transitioned between a 1 minute driving state (load 4.17 kN and 30 km/h speed) and a stopped state, and the running distance (puncture repair distance) until the puncture hole was sealed and air leakage was eliminated was measured. The presence or absence of air leakage was confirmed by checking whether soap water sprayed onto the portion of the puncture hole was foamed. The evaluation results are evaluated on the basis of the number of cycles of the intermittent driving, with "Good" indicating achievement of the sealing with 10 cycles, "Fair" indicating achievement of the sealing with 11 cycles or more, and "Poor" indicating a failure to achieve the sealing.

Rim Shifting:

The amount of shifting between the rim and the tire was measured with each of the test tires mounted on a wheel having a rim size of 20×9.5J, and sudden braking performed 10 times under conditions of a traveling speed 50 km/h and an air pressure 230 kPa. The evaluation results are expressed as index values using the reciprocal of the measurement values, with the value of Comparative Example 1 being defined as 100. Larger index values indicate superior rim shifting.

TABLE 1

|  | Comparative Example 1 | Example 1 | Example 2 | Example 3 | Comparative Example 2 | Comparative Example 3 |
|---|---|---|---|---|---|---|
| Presence of release agent to tire inner surface | No | Yes | Yes | Yes | Yes | Yes (Powder) |
| Thickness of release agent on tire inner surface (μm) | 0 | 0.1 | 10 | 100 | 110 | 110 |
| Air Retention | 100 | 102 | 103 | 104 | 104 | 104 |
| Sealing for puncture repair | Good | Good | Good | Good | Fair | Good |
| Rim shifting | 100 | 100 | 100 | 100 | 100 | 95 |

As can be seen from Table 1, compared with Comparative Example 1, the pneumatic tires of Examples 1 to 3 achieved improvement of both the air retention and the sealing for puncture repair, without resulting in bad rim shifting.

In Comparative Example 2, the sealing for puncture repair was low due to a relatively thick release agent on the tire inner surface. In Comparative Example 3, the release agent, sprayed on the tire inner surface, adhered to the bead portion (contact portion with the rim), resulting in bad rim shifting.

Next, pneumatic tires of Examples 4 to 6 were fabricated through vulcanizing using a bladder provided with a coating layer formed by a release agent as in Examples 1 to 3, with the presence or absence of the release agent on the tire inner surface, and the amount (wt. %) of the release agent (silicon) on the tire inner surface are set as illustrated in Table 2.

Tires of Comparative Example 4 to 6 were also prepared. In Comparative Example 4, vulcanizing was performed with a rigid core used in place of the bladder and the release agent was not used. Comparative Example 5 had the same structure as Example 4 except the amount of the release agent (silicon) on the tire inner surface was set to 11%. Comparative Example 6 had the same structure as Example 4 except vulcanizing was performed with a powdered release agent sprayed on the tire inner surface, and the amount of the release agent (silicon) on the tire inner surface was set to 45%.

Note that in Table 2, the amount of release agent (silicon) on the tire inner surface was calculated on the basis of the amount of release agent (silicon) measured at four locations in the tire circumferential direction and three locations in the tire lateral direction of each test tire after the completion of the fabrication step, using an energy dispersive fluorescent x-ray analyzer (EDX-720, manufactured by Shimadzu Corporation). The measurement conditions were: voltage 50 kV, current 100 μA, integration time 50 sec, and collimator ⌀10 mm in vacuum.

Air retention, sealing for puncture repair, and rim shifting were evaluated for these test tires, and the results were recorded in Table 2.

As can be seen from Table 2, compared with Comparative Example 4, the pneumatic tires of Examples 4 to 6 achieved improvement of both the air retention and the sealing for puncture repair, without resulting in bad rim shifting during traveling.

In Comparative Example 5, the sealing for puncture repair was low due to a relatively large amount of the release agent on the tire inner surface. In Comparative Example 6, the release agent, sprayed on the tire inner surface, adhered to the bead portion (contact portion with the rim), resulting in bad rim shifting.

The invention claimed is:

1. A method for manufacturing a pneumatic tire, the method comprising: vulcanizing a green tire using a bladder having a coating layer formed by a release agent, and partially transferring the release agent from the bladder to form a transfer layer on an inner surface of a tread portion of the pneumatic tire after the vulcanizing such that a portion of the release agent remains on the bladder, wherein the release agent of the transfer layer has a thickness, detected by an electron microscope, of 0.1 μm to 100 μm on the inner surface of the tread portion of the pneumatic tire after the vulcanization, wherein the release agent of the transfer layer is dispersed on the inner surface of the tread portion of the pneumatic tire after the vulcanization such that the release agent is not provided on an entire surface of the inner surface.

2. The method for manufacturing a pneumatic tire according to claim 1, wherein the coating layer is formed on the bladder with a coating time t (hour) and a temperature T (° C.) of the coating layer satisfying $t \geq -0.0571\, T + 9.14$ where $t > 0$ and $10°\ C. \leq T \leq 180°\ C.$ 3. The method for manufacturing a pneumatic tire according to claim 2, the method further comprising: disposing a pair of sidewall portions on both sides of the tread portion; and disposing a pair of bead portions inward of the sidewall portions in a tire radial direction, wherein bead cores are embedded in the respective bead portions, bead fillers are disposed on outer circumferences of the respective bead

|  | Comparative Example 4 | Example 4 | Example 5 | Example 6 | Comparative Example 5 | Comparative Example 6 |
|---|---|---|---|---|---|---|
| Presence of release agent to tire inner surface | No | Yes | Yes | Yes | Yes | Yes (Powder) |
| Amount of release agent (silicon) on tire inner surface (wt. %) | 0 | 0.1 | 2.0 | 10.0 | 11.0 | 45.0 |
| Air Retention | 100 | 102 | 103 | 104 | 104 | 104 |
| Sealing for puncture repair | Good | Good | Good | Good | Fair | Good |
| Rim shifting | 100 | 100 | 100 | 100 | 100 | 95 | cores, and the transfer layer formed by transferring the release agent is disposed in a partial region of the tire inner surface in a tire lateral direction the partial region at least including a region from a top edge position of one of the bead fillers to an upper edge position of the other one of the bead fillers.

4. The method for manufacturing a pneumatic tire according to claim 2, the method comprising: disposing a pair of sidewall portions on both sides of the tread portion; and disposing a pair of bead portions inward of the sidewall portions in a tire radial direction, wherein a carcass layer is provided between the bead portions, a belt layer is disposed on an outer circumference side of the carcass layer in the tread portion, and the transfer layer formed by transferring the release agent is disposed in a partial region of the tire inner surface in a tire lateral direction, the partial region being defined between ends in the tire lateral direction of the belt layer.

5. The method for manufacturing a pneumatic tire according to claim 1, the method further comprising: disposing a pair of sidewall portions on both sides of the tread portion; and disposing a pair of bead portions inward of the sidewall portions in a tire radial direction, wherein bead cores are embedded in the respective bead portions, bead fillers are disposed on outer circumferences of the respective bead cores, and the transfer layer formed by transferring the release agent is disposed in a partial region of the tire inner surface in a tire lateral direction the partial region at least including a region from a top edge position of one of the bead fillers to an upper edge position of the other one of the bead fillers.

6. The method for manufacturing a pneumatic tire according to claim 1, the method comprising: disposing a pair of sidewall portions on both sides of the tread portion; and disposing a pair of bead portions inward of the sidewall portions in a tire radial direction, wherein a carcass layer is provided between the bead portions, a belt layer is disposed on an outer circumference side of the carcass layer in the tread portion, and the transfer layer formed by transferring the release agent is disposed in a partial region of the tire inner surface in a tire lateral direction, the partial region being defined between ends in the tire lateral direction of the belt layer.

7. A method for manufacturing a pneumatic tire, the method comprising: vulcanizing a green tire using a bladder having a coating layer formed by a release agent, and partially transferring the release agent from the bladder to form a transfer layer on an inner surface of a tread portion of the pneumatic tire after the vulcanizing such that a portion of the release agent remains on the bladder, wherein an amount of silicon in the release agent of the transfer layer detected by X-ray fluorescence analysis is 0.1 wt. % to 10.0 wt. % on the inner surface of the tread portion of the pneumatic tire after the vulcanization, wherein the release agent of the transfer layer is dispersed on the inner surface of the tread portion of the pneumatic tire after the vulcanization such that the release agent is not provided on an entire surface of the inner surface.

8. The method for manufacturing a pneumatic tire according to claim 7, wherein the coating layer is formed on the bladder with a coating time t (hour) and a temperature T (° C.) of the coating layer satisfying $t \geq -0.0571\, T + 9.14$ where $t > 0$ and $10° C. \leq T \leq 180° C.$ 9. The method for manufacturing a pneumatic tire according to claim 8, the method further comprising: disposing a pair of sidewall portions on both sides of the tread portion; and disposing a pair of bead portions inward of the sidewall portions in a tire radial direction, wherein bead cores are embedded in the respective bead portions, bead fillers are disposed on outer circumferences of the respective bead cores, and the transfer layer formed by transferring the release agent is disposed in a partial region of the tire inner surface in a tire lateral direction the partial region at least including a region from a top edge position of one of the bead fillers to an upper edge position of the other one of the bead fillers.

10. The method for manufacturing a pneumatic tire according to claim 8, the method comprising: disposing a pair of sidewall portions on both sides of the tread portion; and disposing a pair of bead portions inward of the sidewall portions in a tire radial direction, wherein a carcass layer is provided between the bead portions, a belt layer is disposed on an outer circumference side of the carcass layer in the tread portion, and the transfer layer formed by transferring the release agent is disposed in a partial region of the tire inner surface in a tire lateral direction, the partial region being defined between ends in the tire lateral direction of the belt layer.

11. The method for manufacturing a pneumatic tire according to claim 7, the method further comprising: disposing a pair of sidewall portions on both sides of the tread portion; and disposing a pair of bead portions inward of the sidewall portions in a tire radial direction, wherein bead cores are embedded in the respective bead portions, bead fillers are disposed on outer circumferences of the respective bead cores, and the transfer layer formed by transferring the release agent is disposed in a partial region of the tire inner surface in a tire lateral direction the partial region at least including a region from a top edge position of one of the bead fillers to an upper edge position of the other one of the bead fillers.

12. The method for manufacturing a pneumatic tire according to claim 7, the method comprising: disposing a pair of sidewall portions on both sides of the tread portion; and disposing a pair of bead portions inward of the sidewall portions in a tire radial direction, wherein a carcass layer is provided between the bead portions, a belt layer is disposed on an outer circumference side of the carcass layer in the tread portion, and the transfer layer formed by transferring the release agent is disposed in a partial region of the tire inner surface in a tire lateral direction, the partial region being defined between ends in the tire lateral direction of the belt layer.

\* \* \* \* \*